United States Patent
Rabii

(10) Patent No.: US 9,014,277 B2
(45) Date of Patent: Apr. 21, 2015

(54) ADAPTATION OF ENCODING AND TRANSMISSION PARAMETERS IN PICTURES THAT FOLLOW SCENE CHANGES

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 13/608,493

(22) Filed: Sep. 10, 2012

(65) Prior Publication Data

US 2014/0072035 A1    Mar. 13, 2014

(51) Int. Cl.
*H04N 7/12* (2006.01)
*H04N 11/02* (2006.01)
(Continued)

(52) U.S. Cl.
CPC ......... *H04N 5/147* (2013.01); *H04N 21/43637* (2013.01); *H04N 21/44008* (2013.01); *H04N 21/440254* (2013.01); *H04W 28/22* (2013.01); *H04W 4/18* (2013.01); *H04L 65/602* (2013.01); *H04N 19/176* (2013.01); *H04N 19/172* (2013.01); *H04N 19/61* (2013.01); *H04N 19/124* (2013.01); *H04N 19/127* (2013.01); *H04N19/142* (2013.01); *H04N 19/87* (2013.01); *H04N 19/40* (2013.01)

(58) Field of Classification Search
CPC .................. H04N 19/00472; H04N 21/43637; H04N 21/440254; H04N 19/00921; H04N 19/00263; H04N 19/00103; H04N 19/0009; H04N 21/44008; H04N 19/00163; H04N 5/147; H04N 19/00278; H04N 19/00781; H04W 28/22; H04W 4/18; H04L 65/602

USPC ................................................... 375/240.26
See application file for complete search history.

(56) References Cited

U.S. PATENT DOCUMENTS 5,990,945 A    11/1999    Sinha
6,016,311 A *  1/2000    Gilbert et al. ................. 370/280
(Continued)

FOREIGN PATENT DOCUMENTS

WO    9610875 A1    4/1996
WO    2008119043    10/2008

OTHER PUBLICATIONS

Feng, et al., "Scene change detection algorithm for MPEG video sequence", Proceedings of the International Conference on Image Processing (ICIP) Lausanne, Sep. 16-19, 1996; [Proceedings of the International Conference on Image Processing (ICIP)], New York, IEEE, US, vol. 1, XP010202784, pp. 821-824.
(Continued)

*Primary Examiner* — Hee-Yong Kim
(74) *Attorney, Agent, or Firm* — Shumaker & Sieffert, P.A.

(57) ABSTRACT

A source device in a wireless display system determines whether a scene change has occurred between a first picture and a second picture prior to transmitting an encoded representation of the second picture to a sink device. The scene change occurs when the first picture and the second picture are sufficiently dissimilar. The source device may reduce, in response to determining that the scene change has occurred, a number of coding bits in the encoded representation of the second picture. Furthermore, in response to determining that the scene change has occurred, the source device increases a throughput of a wireless channel. After reducing the number of coding bits in the encoded representation of the second picture and increasing the throughput of the wireless channel, the source device transmits the encoded representation of the second picture to the sink device via the wireless channel.

28 Claims, 7 Drawing Sheets

(51) Int. Cl.
<table>
<tr><td>H04N 11/04</td><td>(2006.01)</td></tr>
<tr><td>H04J 3/00</td><td>(2006.01)</td></tr>
<tr><td>H04W 4/00</td><td>(2009.01)</td></tr>
<tr><td>H04N 5/14</td><td>(2006.01)</td></tr>
<tr><td>H04N 21/4363</td><td>(2011.01)</td></tr>
<tr><td>H04N 21/44</td><td>(2011.01)</td></tr>
<tr><td>H04N 21/4402</td><td>(2011.01)</td></tr>
<tr><td>H04L 29/06</td><td>(2006.01)</td></tr>
<tr><td>H04N 19/176</td><td>(2014.01)</td></tr>
<tr><td>H04N 19/172</td><td>(2014.01)</td></tr>
<tr><td>H04N 19/61</td><td>(2014.01)</td></tr>
<tr><td>H04N 19/124</td><td>(2014.01)</td></tr>
<tr><td>H04N 19/127</td><td>(2014.01)</td></tr>
<tr><td>H04N 19/142</td><td>(2014.01)</td></tr>
<tr><td>H04N 19/87</td><td>(2014.01)</td></tr>
<tr><td>H04N 19/40</td><td>(2014.01)</td></tr>
<tr><td>H04W 28/22</td><td>(2009.01)</td></tr>
<tr><td>H04W 4/18</td><td>(2009.01)</td></tr>
</table>

(56) References Cited

U.S. PATENT DOCUMENTS

<table>
<tr><td>6,075,768 A *</td><td>6/2000</td><td>Mishra ............................ 370/229</td></tr>
<tr><td>6,925,068 B1 *</td><td>8/2005</td><td>Stanwood et al. ............. 370/329</td></tr>
<tr><td>7,079,580 B2</td><td>7/2006</td><td>Sakaguchi</td></tr>
<tr><td>8,179,961 B2</td><td>5/2012</td><td>Chen et al.</td></tr>
<tr><td>2005/0286629 A1</td><td>12/2005</td><td>Dumitras</td></tr>
<tr><td>2006/0239347 A1</td><td>10/2006</td><td>Koul</td></tr>
<tr><td>2007/0274385 A1</td><td>11/2007</td><td>He</td></tr>
<tr><td>2010/0195733 A1</td><td>8/2010</td><td>Yan et al.</td></tr>
</table>

OTHER PUBLICATIONS

International Search Report and Written Opinion—PCT/US2013/056519—ISA/EPO—Oct. 31, 2013, 12 pp.

International Preliminary Report on Patentability from International Application No. PCT/US2013/056519, dated Nov. 17, 2014, 18 pp.

* cited by examiner

ADAPTATION OF ENCODING AND TRANSMISSION PARAMETERS IN PICTURES THAT FOLLOW SCENE CHANGES

TECHNICAL FIELD

The disclosure relates to transport and playback of media data.

BACKGROUND

Wireless display (WD) systems include a source device and one or more sink devices. A source device may be a device that is capable of transmitting media content within a wireless local area network. A sink device may be a device that is capable of receiving and rendering media content. In some examples, a device may be both a source device and a sink device. The source device and the sink device may be either mobile devices or wired devices. As mobile devices, for example, the source device and the sink devices may comprise mobile telephones, portable computers with wireless communication cards, personal digital assistants (PDAs), portable media players, digital image capturing devices, such as cameras or camcorders, or other devices with wireless communication capabilities, including so-called "smart" phones and "smart" pads or tablets, or other types of wireless communication devices. As wired devices, for example, the source device and the sink device may comprise televisions, desktop computers, monitors, projectors, printers, set top boxes, gaming consoles, routers, and digital video disc (DVD) players, and media servers.

A source device may send media data, such as audio video (AV) data, to one or more sink devices participating in a particular media share session. The media data may be played back at both a local display of the source device and at each of the displays of the sink devices. More specifically, each of the participating sink devices may render the received media data for presentation on an associated screen and audio equipment. In some cases, a user of a sink device may apply user inputs to the sink device, such as touch inputs and remote control inputs, to control the content being displayed at the sink device.

SUMMARY

A source device in a wireless display system may adapt the encoding parameters and transmission parameters associated with pictures in response to detecting scene changes between pictures. For instance, the source device may determine whether a scene change occurs between a first picture and a second picture prior to transmitting an encoded representation of the second picture to a sink device. The scene change occurs when the first picture and the second picture are sufficiently dissimilar. The source device may reduce, in response to determining that the scene change has occurred, a number of coding bits in the encoded representation of the second picture. Furthermore, in response to determining that the scene change has occurred, the source device may increase a throughput of a wireless channel. After reducing the number of coding bits in the encoded representation of the second picture and increasing the throughput of the wireless channel, the source device may transmit the encoded representation of the second picture to the sink device via the wireless channel.

In one aspect, this disclosure describes a method for transmitting video data. The method may comprise determining that a scene change has occurred between a first picture in the video data and a second picture in the video data prior to transmitting an encoded representation of the second picture. The method may also comprise reducing, in response to determining that the scene change has occurred, a number of coding bits in the encoded representation of the second picture. In addition, the method may comprise increasing, in response to determining that the scene change has occurred, a throughput of a wireless channel to be used to transmit the encoded representation of the second picture. The method also comprises after reducing the number of coding bits in the encoded representation of the second picture and increasing the throughput of the wireless channel, transmitting the encoded representation of the second picture via the wireless channel.

In another aspect, this disclosure describes a computing device that comprises one or more wireless transmitters and one or more processors that are configured to determine that a scene change has occurred between a first picture of video data and a second picture in the video data prior to transmitting an encoded representation of the second picture. The one or more processors are also configured to reduce, in response to determining that the scene change has occurred, a number of coding bits in the encoded representation of the second picture. Furthermore, the one or more processors are configured to increase, in response to determining that the scene change has occurred, a throughput of a wireless channel to be used to transmit the encoded representation of the second picture. In addition, the one or more processors are configured to use, after reducing the number of coding bits in the encoded representation of the second picture and increasing the throughput of the wireless channel, the one or more wireless transmitters to transmit the encoded representation of the second picture via the wireless channel.

In another aspect, this disclosure describes a computing device that comprises means for determining that a scene change has occurred between a first picture in the video data and a second picture in the video data prior to transmitting an encoded representation of the second picture. The computing device also comprises means for reducing, in response to determining that the scene change has occurred, a number of coding bits in the encoded representation of the second picture. In addition, the computing device comprises means for increasing, in response to determining that the scene change has occurred, a throughput of a wireless channel to be used to transmit the encoded representation of the second picture. The computing device also comprises means for transmitting, after reducing the number of coding bits in the encoded representation of the second picture and increasing the throughput of the wireless channel, the encoded representation of the second picture via the wireless channel.

In another aspect, this disclosure describes a computer program product that comprises one or more computer-readable storage media that store instructions that, when executed by one or more processors of a computing device, configure the computing device to determine that a scene change has occurred between a first picture in the video data and a second picture in the video data prior to transmitting an encoded representation of the second picture. The instructions also configure the one or more processors to reduce, in response to determining that the scene change has occurred, a number of coding bits in the encoded representation of the second picture. In addition, the instructions configure the one or more processors to increase, in response to determining that the scene change has occurred, a throughput of a wireless channel to be used to transmit the encoded representation of the second picture. Furthermore, the instructions configure the one or more processors to use, after reducing the number of coding bits in the encoded representation of the second picture and increasing the throughput of the wireless channel, the one or more wireless transmitters to transmit the encoded representation of the second picture to the sink device via the wireless channel.

The details of one or more examples of the disclosure are set forth in the accompanying drawings and the description below. Other features, objects, and advantages will be apparent from the description, drawings, and claims.

DETAILED DESCRIPTION

Figure 1:
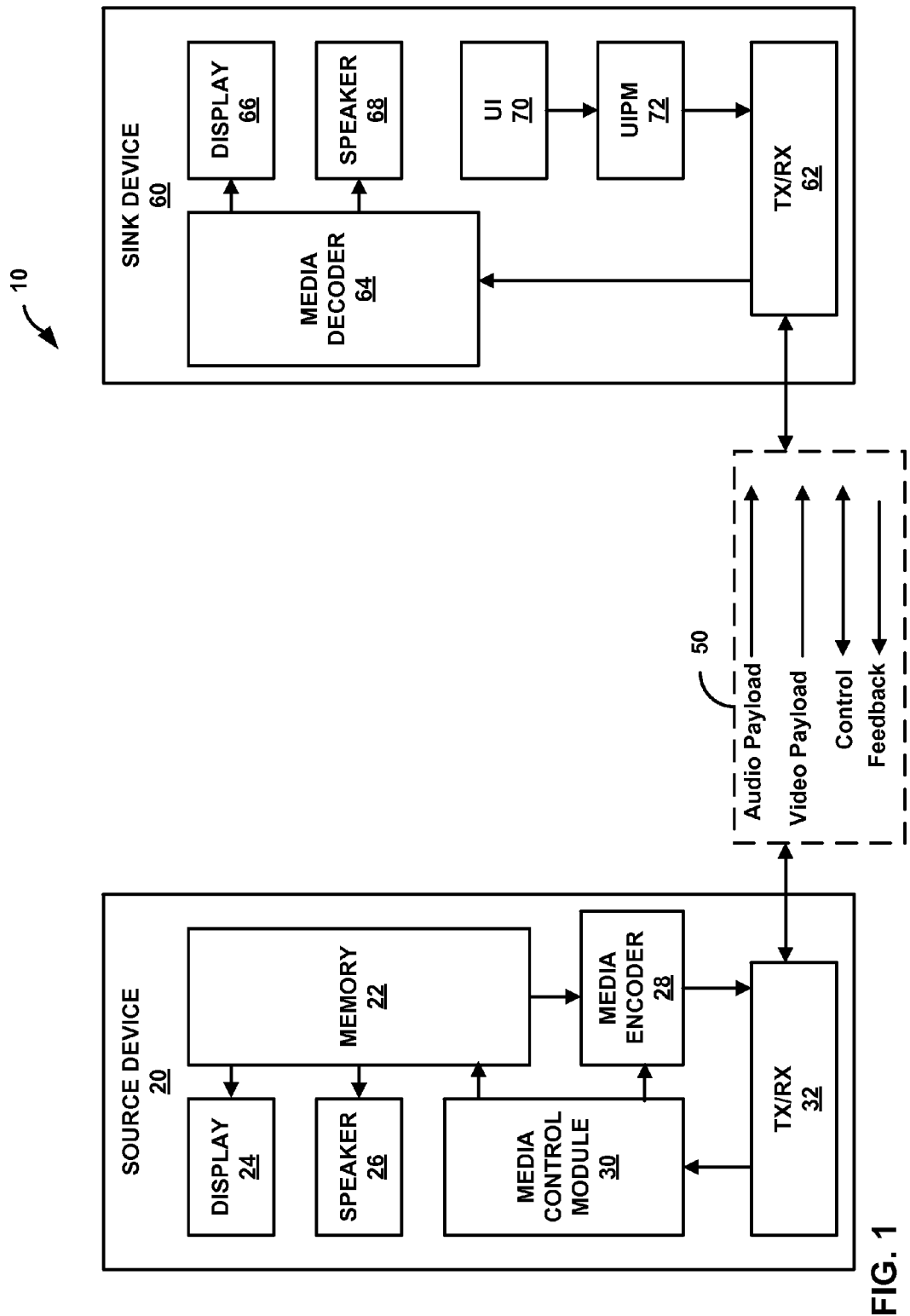
FIG. 1 is a block diagram illustrating a wireless communication system that includes a source device and a sink device.

In general, this disclosure relates to techniques for transmitting video data in a Wireless Display (WD) system. In a WD system, a source device encodes video data and transmits the encoded video data over a wireless channel to a sink device. The sink device may decode the encoded video data and display the decoded video data on a display screen.

In a typical WD system, there is an upper limit on the quantity of data that the source device can wirelessly transmit to the sink device over the wireless channel at any given moment. This upper limit may be referred to as the current bandwidth of the wireless channel. The current bandwidth of the wireless channel may change over time. In other words, the current bandwidth of the wireless channel may be dynamic. Changes in the bandwidth of the wireless channel may be unpredictable. The current bandwidth of the wireless channel can change for various reasons. For example, the current bandwidth of the wireless channel can decrease if a nearby computing device starts using the same frequency as the wireless channel to transmit data, such that the wireless channel is shared between a computing device and another, nearby computing device. In other examples, the current bandwidth of the wireless channel may decrease in response to other factors, such as radio noise generated by nearby electrical devices and appliances.

The quantity of video data being wirelessly transmitted by the source device may also change over time. For example, by using inter-picture prediction when encoding the video data, in general, the source device may reduce the number of coding bits required to represent pictures that have similar content, relative to using intra-picture prediction. Thus, if the video data includes a series of similar or identical pictures, the number of coding bits required to represent this series of pictures using inter-coding may be relatively low compared to intra-coded pictures.

However, there may be points in the video data where there is little similarity between consecutively coded pictures. For example, if the video data is a movie, scene changes may introduce points at which there is little similarity between consecutive pictures. In another example, the video data may represent the virtual desktop of the source device and a user of the source device may open a full screen application. In this example, there may be little similarity between consecutive pictures if one of the pictures occurs before the user opens the full screen application and one of the pictures occurs after the user opens the full screen application. In another example, there may be little similarity between consecutive pictures if the video data includes video captured by a camera and the camera is quickly panned or tilted. In another example, there may be little similarity between consecutive pictures if the video is presented in fast forward or rewind mode or the source device received input to skip forward or back to a particular scene. In another example, there may be little similarity between consecutive pictures if the video is initially of a television program on a first channel and then switches to a television program on a second channel in response to user input. In another example, the similarity between consecutive pictures may be small if the pictures occur during a splice (e.g., a wipe or fade) between scenes. For ease of explanation, this disclosure may use the term "scene change" to refer to situations where there is little similarity between consecutive pictures.

When there is a scene change, inter prediction does not greatly reduce the number of coding bits required to represent the pictures. Rather, substantial intra prediction of such pictures may be required. Accordingly, the quantity of video data that needs to be wirelessly transmitted by the source device may dramatically increase when there is a scene change. Because the quantity of video data that needs to be transmitted over a wireless channel may dramatically increase when there is a scene change and because the current bandwidth of the wireless channel is limited and may change unpredictably, the source device may be unable to wirelessly transmit all of the video data over the wireless channel when there is a scene change. As a result, the sink device may not receive all of the video data representing the picture immediately after the scene change. If the sink device does not receive all of the video data representing the picture immediately after the scene change, one or more pictures immediately after the scene change may appear blocky or torn.

To mitigate such effects, the video source may, according to one or more techniques of this disclosure, detect a scene change between pictures of the video data prior to transmitting an encoded representation of one of the pictures to a sink device. The encoded representation of a picture may include data from which the picture can be decoded. The scene change may occur when the pictures are sufficiently dissimilar. In response to detecting the scene change, the video source may reduce a number of coding bits in the encoded representation of the picture following the scene change and may increase a throughput of a wireless channel. After reducing the number of coding bits in the encoded representation of the picture and increasing the throughput of the wireless channel, the video source may transmit the encoded representation of the picture to the sink device via the wireless channel.

FIG. 1 is a block diagram illustrating an example of a Wireless Display (WD) system 10 in which the techniques of this disclosure may be implemented. FIG. 1 and the following figures are provided for purposes of explanation and should not be considered limiting of the techniques as broadly exemplified and described in this disclosure.

As shown in the example of FIG. 1, WD system 10 may include a source device 20 and a sink device 60. Source device 20 may communicate with sink device 60 via a wireless channel 50. Source device 20 may include a memory 22, a display 24, a speaker 26, a media encoder 28, a media control module 30, and a transmitter/receiver (TX/RX) unit 32. Sink device 60 may include a transmitter/receiver unit (TX/RX) 62, a media decoder 64, a display 66, a speaker 68, a user input (UI) device 70, and a user input processing module (UIPM) 72. The illustrated components constitute merely one example configuration for WD system 10. Other configurations may include fewer components than those illustrated or may include components in addition to those illustrated.

In the example of FIG. 1, source device 20 can display the video portion of media data on display 24 and can output the audio portion of media data using speaker 26. Media data may be stored locally on memory 22, accessed from an external storage medium such as a file server, hard drive, external memory, Blu-ray disc, DVD, or other physical storage medium, or may be streamed to source device 20 via a network connection such as the Internet. In some instances, media data may be captured in real-time via a camera and microphone of source device 20. Media data may include multimedia content such as movies, television shows, or music, and may also include real-time content generated by source device 20. Such real-time content may, for example, be produced by applications running on source device 20, or captured, e.g., as part of a video telephony session. Such real-time content may, in some instances, include a picture of user input options available for a user to select. In some instances, media data may include pictures that are a combination of different types of content, such as a picture of a movie or TV program that has user input options overlaid on the picture.

In addition to rendering media data locally via display 24 and speaker 26, media encoder 28 of source device 20 can encode media data and TX/RX unit 32 can transmit the encoded media data over wireless channel 50 to sink device 60. In some examples, media encoder 28 may re-encode already encoded media data. In other words, media encoder 28 may transcode media data. TX/RX unit 62 of sink device 60 may receive the encoded media data, and media decoder 64 may decode the encoded media data and output the decoded media data for presentation on display 66 and speaker 68. In this manner, the audio and video data being rendered by display 24 and speaker 26 can be simultaneously rendered by display 66 and speaker 68. The audio data and video data may be arranged in frames, and the audio frames may be time-synchronized with the video frames (i.e., pictures) when rendered.

Media encoder 28 and media decoder 64 may include encoder/decoder (CODEC) units that implement various audio and video compression standards, such as the ITU-T H.264 standard, alternatively referred to as MPEG-4, Part 10, Advanced Video Coding (AVC), or the newly emerging high efficiency video coding (HEVC) standard. Many other types of proprietary or standardized compression techniques may also be used. Generally speaking, media decoder 64 is configured to perform the reciprocal coding operations of media encoder 28. Although not shown in FIG. 1, in some aspects, media encoder 28 and media decoder 64 may each be integrated with an audio encoder and decoder, and may include appropriate MUX-DEMUX units, or other hardware and software, to handle encoding of both audio and video in a common data stream or separate data streams.

Media encoder 28 may also perform other encoding functions in addition to implementing a video compression standard as described above. For example, media encoder 28 may add various types of metadata to media data prior to the media data being transmitted to sink device 60. In some instances, media data may be stored on or received at source device 20 in an encoded form and thus not require further compression by media encoder 28.

Although FIG. 1 shows wireless channel 50 carrying audio payload data and video payload data separately, it is to be understood that in some instances video payload data and audio payload data may be part of a common data stream, and may be multiplexed or otherwise interleaved with one another. If applicable, MUX-DEMUX units may conform to the ITU H.223 multiplexer protocol, or other protocols such as the user datagram protocol (UDP). Media encoder 28 and media decoder 64 each may be implemented as one or more microprocessors, digital signal processors (DSPs), application specific integrated circuits (ASICs), field programmable gate arrays (FPGAs), discrete logic, software, hardware, firmware or any combinations thereof. In examples where one or more aspects are implemented in software, underlying hardware (e.g., in the form of a programmable processor) may execute the software. Each of media encoder 28 and media decoder 64 may be included in one or more encoders or decoders, either of which may be integrated as part of a combined encoder/decoder (CODEC). Thus, each of source device 20 and sink device 60 may comprise specialized machines configured to execute one or more of the techniques of this disclosure.

Display 24 and display 66 may comprise any of a variety of video output devices such as a cathode ray tube (CRT) display, a liquid crystal display (LCD), a plasma display, a light emitting diode (LED) display, an organic light emitting diode (OLED) display, or another type of display device. In these or other examples, display 24 and 66 may each be emissive displays or transmissive displays. Display 24 and display 66 may also be touch displays such that they are simultaneously both input devices and display devices. Such touch displays may be capacitive, resistive, or other types of touch panel that allows users to provide user input to the respective devices.

Speaker 26 and speaker 68 may comprise any of a variety of audio output devices such as headphones, single-speaker systems, multi-speaker systems, or surround sound systems. Additionally, although display 24 and speaker 26 are shown as part of source device 20 and display 66 and speaker 68 are shown as part of sink device 60, source device 20 and sink device 60 may in fact be a system of devices. As one example, display 66 may be a television, speaker 68 may be a surround sound system, and media decoder 64 may be part of an external box connected, either wired or wirelessly, to display 66 and speaker 68. In other instances, sink device 60 may be a single device, such as a tablet computer or smartphone. In still other cases, source device 20 and sink device 60 are similar devices, e.g., both being smartphones, tablet computers, or the like. In this case, one device may operate as the source and the other may operate as the sink. These roles may be reversed in subsequent communication sessions. In still other cases, source device 20 may comprise a mobile device, such as a smartphone, laptop or tablet computer, and sink device 60 may comprise a more stationary device (e.g., with an AC power cord), in which case source device 20 may deliver audio and video data for presentation to a one or more viewers via sink device 60.

TX/RX unit 32 and TX/RX unit 62 may each include various mixers, filters, amplifiers and other components designed for signal modulation, as well as one or more antennas and other components designed for transmitting and receiving data. Wireless channel 50 generally represents any suitable communication medium, or collection of different communication media, for transmitting media data, control data and feedback between source device 20 and sink device 60. Wireless channel 50 is usually a relatively short-range communication channel, and may implement a physical channel structure similar to Wi-Fi, Bluetooth, or the like, such as implementing defined 2.4, GHz, 3.6 GHz, 5 GHz, 60 GHz or Ultrawideband (UWB) frequency band structures. However, wireless channel 50 is not necessarily limited in this respect, and may comprise a wireless communication medium, such as a radio frequency (RF) spectrum or one or more physical transmission lines, or a combination of wireless and wired media. In other examples, wireless channel 50 may even form part of a packet-based network, such as a wired or wireless local area network, a wide-area network, or a global network such as the Internet. Additionally, wireless channel 50 may be used by source device 20 and sink device 60 to create a peer-to-peer link.

Source device 20 and sink device 60 may establish a communication session according to a capability negotiation using, for example, Real-Time Streaming Protocol (RTSP) control messages. In one example, a request to establish a communication session may be sent by source device 20 to sink device 60. Once the communication session is established, source device 20 may transmit media data, e.g., audio video (AV) data, to sink device 60. Source device 20 may transmit media data to sink device 60, for example, using the Real-time Transport protocol (RTP). Sink device 60 may render the received media data on display 66 and speaker 68.

Source device 20 and sink device 60 may communicate over wireless channel 50 using a communications protocol such as a standard from the IEEE 802.11 family of standards. In one example, wireless channel 50 may be a network communication channel. In this example, a communication service provider may centrally operate and administer the network using a base station as a network hub. Source device 20 and sink device 60 may, for example, communicate according to the Wi-Fi Direct or Wi-Fi Display (WFD) standards, such that source device 20 and sink device 60 may communicate directly with one another without the use of an intermediary such as a wireless access point or a so-called hotspot. Relatively short distance in this context may refer to, for example, less than approximately seventy meters, although in a noisy or obstructed environment, the distance between devices may be even shorter, such as less than approximately thirty-five meters, or less than approximately twenty meters.

The techniques of this disclosure may at times be described with respect to WFD, but it is contemplated that aspects of these techniques may also be compatible with other communication protocols. By way of example and not limitation, the wireless communication between source device 20 and sink device 60 may utilize orthogonal frequency division multiplexing (OFDM) techniques. A wide variety of other wireless communication techniques may also be used, including but not limited to time division multiple access (TDMA), frequency division multiple access (FDMA), code division multiple access (CDMA), or any combination of OFDM, FDMA, TDMA and/or CDMA.

In addition to decoding and rendering media data received from source device 20, sink device 60 can also receive user inputs from user input device 70. User input device 70 may, for example, include a keyboard, mouse, electronic pen, trackball or track pad, touch screen, voice command recognition module, or any other such user input device. UIPM 72 may format user input commands received by user input device 70 into a data packet structure that source device 20 is capable of processing. Such data packets may be transmitted by TX/RX unit 62 to source device 20 over wireless channel 50.

TX/RX unit 32 may receive the data packets, and media control module 30 may parse the data packets to interpret the user input command that was received by user input device 70. Based on the user input command received in the data packet, media control module 30 may change the media content being encoded and transmitted. In this manner, a user of sink device 60 can control the media data being transmitted by source device 20 remotely and without directly interacting with source device 20.

Additionally, users of sink device 60 may be able to launch and control applications on source device 20. As an illustration, a user of sink device 60 may able to launch a photo editing application stored on source device 20 and use the application to edit a photo that is stored locally on source device 20. Sink device 60 may present a user with a user experience that looks and feels like the photo is being edited locally on sink device 60 while in fact the photo is being edited on source device 20. Using such a configuration, a user may be able to leverage the capabilities of one device for use with several devices. For example, source device 20 may comprise a smartphone with a large amount of memory and high-end processing capabilities. When watching a movie, however, the user may wish to watch the movie on a device with a bigger display screen, in which case sink device 60 may be a tablet computer or even larger display device or television. When wanting to send or respond to email, the user may wish to use a device with a physical keyboard, in which case sink device 60 may be a laptop. In both instances, the bulk of the processing may still be performed by source device 20 even though the user is interacting with sink device 60. Source device 20 and sink device 60 may facilitate two way interactions by transmitting control data, such as, data used to negotiate and/or identify the capabilities of the devices in any given session over wireless channel 50.

In some configurations, media control module 30 may comprise an operating system process being executed by one or more processors of an operating system of source device 20. In other configurations, media control module 30 may comprise a software process of an application running on source device 20. In such a configuration, the user input command may be interpreted by the software process, such that a user of sink device 60 is interacting directly with the application running on source device 20, as opposed to the operating system running on source device 20. By interacting directly with an application as opposed to an operating system, a user of sink device 60 may have access to a library of commands that are not native to the operating system of source device 20. Additionally, interacting directly with an application may enable commands to be more easily transmitted and processed by devices running on different platforms.

User inputs applied at sink device 60 may be sent back to source device 20 over wireless channel 50. In one example, a reverse channel architecture, also referred to as a user interface back channel (UIBC) may be implemented to enable sink device 60 to transmit the user inputs applied at sink device 60 to source device 20. The UIBC architecture may include upper layer messages for transporting user inputs, and lower layer messages for negotiating user interface capabilities at sink device 60 and source device 20. The UIBC may reside over the Internet Protocol (IP) transport layer between sink device 60 and source device 20. In this manner, the UIBC may be above the transport layer in the Open System Interconnection (OSI) communication model. To promote reliable transmission and in-sequence delivery of data packets containing user input data, UIBC may be configured to run on top of other packet-based communication protocols such as the transmission control protocol/internet protocol (TCP/IP) or the user datagram protocol (UDP). UDP and TCP may operate in parallel in the OSI layer architecture. TCP/IP may enable sink device 60 and source device 20 to implement retransmission techniques in the event of packet loss.

Video data transmitted by source device 20 may include a series of pictures. The pictures may alternatively be referred to as video frames. When media encoder 28 encodes a picture, media encoder 28 may partition the picture into a set of non-overlapping video blocks. For instance, if media encoder 28 is encoding the picture using the H.264 coding process, media encoder 28 may partition the picture into a set of macroblocks. If media encoder 28 is encoding the picture using HEVC, media encoder 28 may partition the picture into a set of coding units (CUs). Each of the video blocks may be a rectangular (e.g., square) block of samples (e.g., pixel values) in the picture media encoder 28 may perform intra prediction or inter prediction on each of the video blocks in the picture.

When media encoder 28 performs intra prediction on a video block in a picture (e.g., the current video block in the current picture), media encoder 28 may generate, based on other samples in the current picture, a predictive video block associated with the current video block. The predictive video block may be the same size (e.g., have the same height and width) as the current video block. Media encoder 28 may generate the predictive video block by extending samples of video blocks that spatially neighbor the current video block across the predictive video block in a pattern indicated by an intra prediction mode. In addition, when media encoder 28 performs intra prediction on the current video block, media encoder 28 may output data that indicate the intra prediction mode.

Media encoder 28 may perform uni-directional inter prediction or bi-directional inter prediction on the current video block. If media encoder 28 performs uni-directional inter prediction on the current video block, media encoder 28 may generate a predictive video block associated with the current video block. The predictive video block for the current video block may match a reference block. The reference block may be a block of samples within a reference picture or the reference block may be a block of samples interpolated from samples within a reference picture. A reference picture may be a picture that occurs before the current picture in coding order, but may occur before or after the current picture in playback order. In addition, media encoder 28 may generate a reference picture index that identifies the reference picture and a motion vector that indicates a spatial displacement between the current video block and the reference block.

If media encoder 28 performs bi-directional inter-picture prediction on the current video block, media encoder 28 may interpolate a predictive video block associated with the current video block from two reference blocks. Each of the reference blocks may be a block of samples within a reference picture or a block of samples interpolated from a block of samples within a reference picture. In addition, media encoder 28 may generate reference picture indexes that identify the reference pictures and may generate motion vectors that indicate spatial displacements between the current video block and the reference blocks.

After media encoder 28 generates the predictive video block for the current video block, media encoder 28 may generate a block of residual samples for the current video block. The block of residual samples may indicate the difference between the current video block and the predictive video block for the current video block. Media encoder 28 may then apply a transform to the block of residual samples to generate a block of transform coefficients. For example, media encoder 28 may apply a discrete cosine transform (DCT) to the block of residual samples to generate the block of transform coefficients.

After generating the block of transform coefficients, media encoder 28 may quantize the transform coefficients. Quantizing the transform coefficients may reduce the bit depths of the transform coefficients and thereby reduce the number of bits required to represent the transform coefficients. However, quantizing the transform coefficients may diminish the visual quality of the video data. A quantization parameter (QP) may control the degree to which media module 128 reduces the bit depth of the transform coefficients during quantization. In general, higher QP values may be associated with greater reductions in the bit depths of the transform coefficients. Lower QP values may be associated with lesser reductions in the bit depths of the transform coefficients.

After quantizing the transform coefficients, media encoder 28 may entropy encode the transform coefficients and output the encoded transform coefficients. For example, media encoder 28 may use context-adaptive binary arithmetic coding (CABAC) to entropy encode at least some syntax elements that represent the transform coefficients. TX/RX unit 32 may wirelessly transmit the encoded video data generated by media encoder 28.

The number of coding bits in the encoded representation of a picture that immediately follows a scene change may be much larger than the number of coding bits in the encoded representation of a picture that immediately precedes the scene change. In other words, the bit rate for the picture that follows the scene change may be larger than the bit rate for the picture that precedes the scene change. The bit rate of a picture may be the number of coding bits in the encoded representation of the picture divided by the amount of time that the picture is to be presented for display. The difference in bit rates may be due, at least in part, to the fact that there is little temporal redundancy between these two pictures. Because there is little temporal redundancy between these two pictures, the use of inter prediction may not greatly reduce the number of coding bits in the encoded representation of the picture that follows the scene change.

There may be an upper limit on the quantity of data that source device 20 is able to wirelessly transmit to sink device 60 over wireless channel 50 at any given moment. This upper limit may be referred to as the current bandwidth of wireless channel 50. The current bandwidth of wireless channel 50 may change over time. For example, the current bandwidth of wireless channel 50 may decrease if a distance between source device 20 and sink device 60 increases. In another example, the current bandwidth of wireless channel 50 may decrease if a source of radio interference is introduced. In another example, the current bandwidth of wireless channel 50 may decrease if an obstacle occurs between source device 20 and sink device 60.

Furthermore, some of the data transmitted over wireless channel 50 may be overhead data and not encoded video data. Example types of overhead data may include packet headers, forward error correction bits, checksums, and so on. In addition, source device 20 may retransmit some data over wireless channel 50 if such data is lost or corrupted during transmission. Because of the overhead data and retransmission of data, the rate at which source device 20 can actually transmit encoded video data to sink device 60 over wireless channel 50 may be less than the current bandwidth of wireless channel 50. In other words, the "throughput" of wireless channel 50 may be less than the current bandwidth of wireless channel 50.

Because the number of coding bits in the encoded representation of a picture that follows a scene change may be very large and because the throughput of wireless channel 50 may be limited, source device 20 may be unable to transmit all of the coding bits of the encoded representation of the picture over wireless channel 50 by the time that sink device 60 is supposed to display the picture. As a result, various undesired visual artifacts may occur when sink device 60 attempts to display the picture. For example, tearing artifacts may occur when sink device 60 is only able to decode portions of the picture.

In accordance with the techniques of this disclosure, source device 20 may determine whether a scene change occurs between a first picture and a second picture prior to transmitting an encoded representation of the second picture. The scene change may occur when the dissimilarity between the first picture and the second picture exceeds a threshold. Scene changes may occur for a variety of reasons. For example, if the video data includes a movie or television program, a scene change may occur when the movie or television program stops displaying one visual field (e.g., a scene) and starts displaying a different visual field (e.g., a different scene). In another example, if the video data includes a graphical user interface, a scene change may occur when a user opens a new window or full screen application.

In response to determining that a scene change has occurred, source device 20 may reduce a number of coding bits in the encoded representation of the second picture. In addition, source device 20 may increase, in response to detecting the scene change, a throughput of wireless channel 50. After reducing the number of coding bits in the encoded representation of the second picture and increasing the throughput of the wireless channel, source device 20 may transmit the encoded representation of the second picture via the wireless channel 50. In this way, source device 20 may be able to reduce undesired visual artifacts in the second picture, at the possible expense of decreased visual quality and increased power consumption. Even though the second picture may have decreased visual quality, a user may find this to be more appealing than the visual artifacts associated with situations where sink device 60 does not receive all coding bits of the encoded representation of the second picture.

Source device 20 may determine in various ways that a scene change has occurred. For example, source device 20 may determine, based at least in part on the spatial and temporal complexity of a picture, whether a scene change has occurred between the picture and the previously encoded picture. In this example, a picture may have high spatial complexity if there is a high number of intra predicted video blocks in the picture as compared to inter predicted and skip mode video blocks in the picture. Similarly, a picture may have high temporal complexity if there is a high number of inter predicted video blocks in the picture as compared to intra predicted video blocks in the picture. Thus, if the spatial complexity of the picture is high (and the temporal complexity of the picture is low), the picture may be highly dissimilar from previously coded pictures in the video data. Accordingly, source device 20 may determine that a scene change has occurred if the spatial complexity of the picture is high and the temporal complexity of the picture is low. Hence, in this example, source device 20 may determine that a scene change has occurred, based at least in part on numbers of inter predicted video blocks in the encoded representation of the current picture, skip mode video blocks in the encoded representation of the current picture, and intra predicted video blocks in the encoded representation of the current picture. For example, a larger number of intra-predicted blocks, relative to the number of inter-predicted blocks, may indicate a scene change.

Source device 20 may reduce a number of coding bits in the encoded representation of the current picture in various ways. For example, source device 20 may re-encode the current picture using a larger QP value, such as a maximum QP value. In this example, re-encoding the current picture using the larger QP value may reduce the bit depths of transform coefficients of video blocks in the current picture to a lowest allowed bit depth. In other examples, low QP values may correspond to higher degrees of quantization. In such examples, source device 20 may re-encode the current picture using a smaller QP value, such as a minimum QP value. In either case, source device 20 may re-encode the current picture with an increased degree of quantization. For ease of explanation, the remainder of this disclosure assumes that higher QP values are associated with increased degrees of quantization. However, the techniques of this disclosure may be implemented where smaller QP values are associated with increased degrees of quantization.

In another example, source device 20 may reduce the number of coding bits in the encoded representation of the current picture by re-encoding the current picture as an instantaneous decoding refresh (IDR) picture. An IDR picture may only include intra predicted video blocks, and may not include inter predicted video blocks. Re-encoding the current picture as an IDR picture may reduce the number of coding bits in the encoded representation of the current picture because a video decoder may assume that all video blocks of the current picture are intra predicted. Accordingly, the re-encoded representation of the current picture does not need to include data to specify which video blocks of the current picture are inter predicted and which video blocks of the current picture are intra predicted.

In another example, source device 20 may reduce the number of coding bits in the encoded representation of the current picture by re-encoding the current picture as a first picture of a group of pictures (GOP). A GOP may be a sequence of pictures that are related to one another through inter prediction dependencies. By re-encoding the current picture as the first picture of a GOP, source device 20 may break any dependency between the current picture and pictures that occur before the scene change. In some examples, source device 20 may re-encode, in response to determining that the scene change has occurred, the current picture such that each slice in the current picture is an intra predicted slice, each slice in the current picture is an instantaneous decoder refresh slice, and the current picture is a starting picture of a group of pictures.

Source device 20 may reverse, over the course of encoding and transmitting one or more pictures after the scene change, the measures taken to reduce the number of coding bits in the encoded representation of the current picture when encoding pictures that follow the current picture in coding order (i.e., the order in which source device 20 and sink device 60 respectively encode and decode the pictures). For example, a first picture may occur before a second picture in coding order and the second picture may occur before a third picture in coding order. In this example, source device 20 may re-encode the first picture using a larger QP value (e.g., a maximum QP value) if the first picture follows a scene change. In this example, source device 20 may encode the second picture using a QP value that is lower than the QP value used to encode the first picture. In this example, source device 20 may encode the third picture using a QP value that is lower than the QP value used to encode the second picture, and so on. In this way, source device 20 may gradually decrease the QP value in the pictures following a scene change to gradually reduce the amount of quantization, and thereby increase the number of coding bits used to code the successive frames.

As indicated above, source device 20 may increase the throughput of wireless channel 50 in addition to reducing the number of coding bits in the encoded representation of the current picture. Source device 20 may increase the throughput of wireless channel 50 in various ways. For example, source device 20 may transmit the encoded representation of the current picture in a series of one or more packets. These packets may include error correction bits that sink device 60 may use to correct bits that were corrupted during transmission over wireless channel 50. For instance, the packets may include forward error correction (FEC) bits that sink device 60 may use to correct corrupted bits. In this example, source device 20 may include fewer error correction bits in the packets that contain the encoded representation of the current picture. In this way, source device 20 may reduce forward error correction data in response to determining that the scene change has occurred. As a result, sink device 60 may be able to correct fewer errors in the encoded representation of the current picture, but the packets may be able to contain more coding bits of the encoded representation of the current picture. Thus, reducing the number of error correction bits in the packets may result in an increase the rate at which source device 20 can transmit coding bits of encoded video data to sink device 60 over wireless channel 50. In other words, reducing the number of error correction bits in the packets may increase the throughput of wireless channel 50.

In another example, source device 20 may increase the throughput of wireless channel 50 by restricting retransmission of lost packets. In this example, one or more packets containing the encoded representation of the current picture may be lost during transmission over wireless channel 50. If sink device 60 determines that a packet has been lost during transmission, sink device 60 may transmit a request to source device 20 to retransmit the lost packet. When retransmission of lost packets is enabled, source device 20 may retransmit the lost packet over wireless channel 50 in response to a request to retransmit the lost packet. Source device 20 may be unable to transmit other packets over wireless channel 50 while retransmitting the lost packet. Thus, retransmitting lost packets may reduce the rate at which source device 20 is able to transmit new encoded video data to sink device 60 over wireless channel 50. When retransmission of lost packets is restricted, source device 20 may reduce a rate at which source device 20 retransmits packets. For example, when source device 20 restricts retransmission of lost packets, source device 20 may delay retransmission of lost packets or deprioritize retransmission of lost packets. In some examples, when source device 20 restricts retransmission of lost packets, source device 20 may disable retransmission of lost packets. When retransmission of lost packets is disabled, source device 20 does not retransmit a lost packet over wireless channel 50 in response to a request to retransmit the lost packet. As a result, restricting retransmission of lost packets may increase the rate at which source device 20 is able to transmit new encoded video data to sink device 60 over wireless channel 50. However, restricting retransmission of lost packets may prevent sink device 60 from decoding some portions of one or more pictures.

In other examples, TX/RX unit 32 may be equipped for Multiple Input Multiple Output (MIMO). In examples where TX/RX unit 32 is equipped for MIMO, TX/RX unit 32 may include multiple antennas that may concurrently transmit data. The rate at which source device 20 is able to transmit data over wireless channel 50 may increase if source device 20 concurrently uses multiple antennas to transmit the data. However, source device 20 may consume additional electrical energy for each additional antenna used to transmit data. Hence, source device 20 may conserve battery power by only using some of the antennas to transmit data. In some such examples, source device 20 may increase the throughput of wireless channel 50 in response to detecting a scene change by increasing the number of antennas used to transmit the encoded representation of the current picture. For instance, source device 20 may use all transmit antennas of TX/RX unit 32 to transmit the encoded representation of the current picture.

In some examples, source device 20 may increase the throughput of wireless channel 50 by increasing the transmission power used when transmitting packets that contain encoded representations of pictures that follow a scene change. When source device 20 transmits a packet using higher power, the packet is less likely to be lost or corrupted during transmission over wireless channel 50. By reducing the number of lost or corrupted packets, the rate at which sink device 60 receives encoded video data over wireless channel 50 may increase. However, transmitting a packet using higher power may consume additional electrical power.

In some examples, source device 20 may increase the throughput of wireless channel 50 by increasing a maximum service data unit (SDU) size of packets that contain the encoded representation of the current picture. By increasing the maximum SDU size, each of the packets may contain more encoded video data. At the same time, the overhead data (e.g., packet headers, etc.) of the packets may remain constant when the maximum SDU size increases. Thus, each of the packets may include more encoded video data relative to the amount of overhead data in the packets. Furthermore, because source device 20 transmits more encoded video data in each of the packets, source device 20 may transmit less overhead data. Consequently, the rate at which source device 20 is able to transmit coding bits in the encoded video data over wireless channel 50 may increase when source device 20 increases the maximum SDU size. However, the loss of a packet may result in the loss of more encoded video data when the maximum SDU size is large than when the maximum SDU size is relatively small.

In some examples, source device 20 may increase the throughput of wireless channel 50 by aggregating packets that contain the encoded representation of the current picture. When source device 20 aggregates packets, source device 20 may generate a single packet that includes the payload data of multiple packets, but only includes a single header. Thus, the ratio of payload data to header data may increase. Accordingly, the rate at which source device 20 is able to transmit encoded video data over wireless channel 50 may increase when source device 20 aggregates packets. However, the loss of an aggregated packet may result in the loss of more encoded video data than the loss of a single, non-aggregated packet.

In some examples, source device 20 may perform a combination of two or more of the examples provided above to increase the throughput of wireless channel 50. For example, source device 20 may increase the throughput of wireless channel 50 by aggregating packets, restricting or disabling retransmission of lost packets, increasing transmission power, increasing the number of antennas, and so on.

Source device 20 may reverse, over the course of encoding and transmitting one or more pictures after the scene change, the measures taken to increase the throughput of wireless channel 50 when transmitting encoded representations of pictures that follow a scene change in coding order. In other words, source device 20 may decrease the throughput of wireless channel 50 for the pictures that follow the current picture. For example, a first picture may occur before a second picture in coding order and the second picture may occur before a third picture in coding order. In this example, source device 20 may use eight antennas to transmit the encoded representation of the first picture, seven antennas to transmit the encoded representation of the second picture, six antennas to transmit the encoded representation of the third picture, and so on. In another example, source device 20 may use a high power level to transmit packets that contain the encoded representation of the first picture, a lower power level to transmit packets that contain the encoded representation of the second picture, a still lower power level to transmit packets that contain the encoded representation of the third picture, and so on. In another example, source device 20 may use a maximum SDU size in packets that contain the encoded representation of the first picture, a smaller SDU size in packets that contain the encoded representation of the second picture, a yet smaller SDU size in packets that contain the encoded representation of the third picture, and so on. By gradually reversing the measures taken to increase the throughput of wireless channel 50, source device 20 may reduce energy consumption and increase the quality of the decoded video data.

Figure 2:
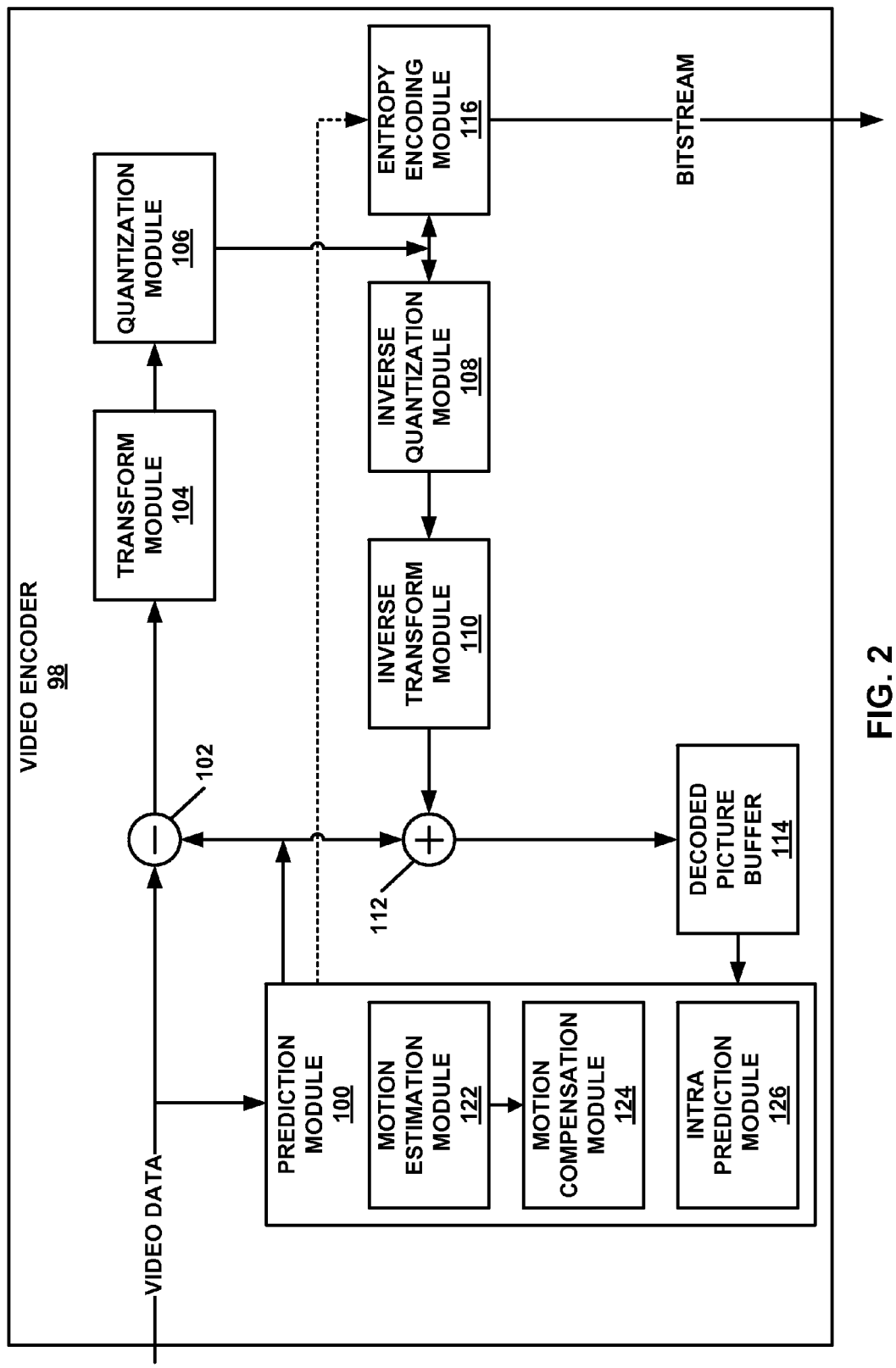
FIG. 2 is a block diagram that illustrates an example video encoder that is configured to implement one or more techniques of this disclosure.

FIG. 2 is a block diagram that illustrates an example video encoder 98 that is configured to implement one or more techniques of this disclosure. Media encoder 28 of source device 20 may include video encoder 98. In the example of FIG. 2, video encoder 98 includes a plurality of functional components. The functional components of video encoder 98 include a prediction module 100, a residual generation module 102, a transform module 104, a quantization module 106, an inverse quantization module 108, an inverse transform module 110, a reconstruction module 112, a decoded picture buffer 114, and an entropy encoding module 116. Prediction module 100 includes a motion estimation module 122, a motion compensation module 124, and an intra prediction module 126. In other examples, video encoder 98 may include more, fewer, or different functional components. Furthermore, motion estimation module 122 and motion compensation module 124 may be highly integrated, but are represented in the example of FIG. 2 separately for purposes of explanation.

Video encoder 98 may receive video data. The video data may represent a series of pictures. To encode the video data, video encoder 98 may perform an encoding operation on each of the pictures. As part of performing the encoding operation on a picture, video encoder 98 may perform encoding operations on each slice of the picture. As part of performing an encoding operation on a slice, video encoder 98 may perform encoding operations on video blocks in the slice. For example, if video encoder 98 is encoding the video data using H.264, video encoder 98 may perform encoding operations on macroblocks. In examples where video encoder 98 is encoding the video data using HEVC, video encoder 98 may perform encoding operations on coding units.

Motion estimation module 122 and motion compensation module 124 may perform inter prediction on a current video block (or in the case of HEVC, prediction units within the current video block). The current video block may be a video block that video encoder 98 is currently encoding. Motion estimation module 122 and motion compensation module 124 may perform different inter prediction operations on the current video block depending on whether the current video block is in an I slice, a P slice, or a B slice. In an I slice, all video blocks are intra predicted. Hence, if the current video block is in an I slice, motion estimation module 122 and motion compensation module 124 do not perform inter prediction on the current video block.

When the current video block is in a P slice, motion estimation module 122 may search the reference pictures in a first reference picture list (e.g., list 0) for a block of samples that most closely corresponds to the current video block. In some instances, motion estimation module 122 may interpolate the identified block of samples from actual samples in a reference picture. After identifying the block of samples, motion estimation module 122 may generate a reference picture index that indicates the reference picture in list 0 containing the identified block of samples and a motion vector that indicates a spatial displacement between the current video block and the identified block of samples. Motion estimation module 122 may output the reference picture index and the motion vector as the motion information of the current video block. Motion compensation module 124 may generate a predictive video block associated with the current video block based on the identified block of samples. For instance, motion compensation module 124 may generate a predictive video block associated with the current video block such that the predictive video block matches the identified block of samples.

If the current video block is in a B slice, motion estimation module 122 may perform uni-directional inter prediction or bi-directional inter prediction for the current video block. When motion estimation module 122 performs uni-directional inter prediction for the current video block, motion estimation module 122 may search the reference pictures of list 0 or a second reference picture list (e.g., list 1) for a block of samples that corresponds to the current video block. Motion estimation module 122 may then generate a reference picture index that indicates the reference picture in list 0 or list 1 that contains the identified block of samples and a motion vector that indicates a spatial displacement between the identified block of samples and the current video block. Motion estimation module 122 may output the reference picture index, a prediction direction indicator, and the motion vector as the motion information of the current video block. The prediction direction indicator may indicate whether the reference picture index indicates a reference picture in list 0 or list 1. Motion compensation module 124 may generate a predictive video block associated with the current video block based on the identified block of samples indicated by the motion information of the current video block.

When motion estimation module 122 performs bi-directional inter prediction for the current video block, motion estimation module 122 may search the reference pictures in list 0 and the reference pictures in list 1 for blocks of samples that correspond to the current video block. Motion estimation module 122 may then generate reference picture indexes that indicate the reference pictures in list 0 and list 1 containing the identified blocks of samples and motion vectors that indicate spatial displacements between the identified blocks of samples and the current video block. Motion estimation module 122 may also generate prediction direction indicators that indicate whether the current video block is uni-directionally inter predicted based on a reference picture in list 0, uni-directionally inter predicted based on a reference picture in list 1, or bi-directionally inter predicted. Motion estimation module 122 may output the reference picture indexes, the motion vectors, and the prediction direction indicators as the motion information of the current video block. Motion compensation module 124 may generate a predictive video block associated with the current video block based on the identified blocks of samples.

Intra prediction module 126 may perform intra prediction on the current video block. Intra prediction module 126 may perform intra prediction on video blocks in I slices, P slices, and B slices. When intra prediction module 126 performs intra prediction on the current video block, intra prediction module 126 may use multiple intra prediction modes to generate multiple predictive video blocks associated with the current video block. Intra prediction module 126 may then select one of the predictive video blocks based, for example, on a rate/distortion analysis. When intra prediction module 126 uses an intra prediction mode to generate a predictive video block associated with the current video block, intra prediction module 126 may extend samples from video blocks that neighbor the current video block across the current video block in a direction and/or gradient associated with the intra prediction mode. Intra prediction module 126 may use various numbers of intra prediction modes, e.g., 33 directional intra prediction modes, depending on the size of the current video block.

Prediction module 100 may select a prediction mode for the current video block. For instance, prediction module 100 may select inter prediction mode or the intra prediction mode, based on rate/distortion metrics of predictive video blocks associated with the current video block and other data generated by motion estimation module 122, motion compensation module 124, and intra prediction module 126. In some instances, prediction module 100 may select a skip mode for the current video block. If prediction module 100 selects the skip mode for the current video block, a predictive video block associated with the current video block may be the same as a collocated video block in a previously-coded picture.

After prediction module 100 selects the prediction mode for the current video block, residual generation module 102 may generate a residual video block associated with the current video block by subtracting the current video block from the predictive video block generated for the current video block using the selected prediction mode. Transform module 104 may then generate one or more transform coefficient blocks by applying one or more transforms to a residual video block. The transform coefficient blocks may be 2D matrixes of transform coefficients. Transform module 104 may apply various transforms to the residual video blocks. For example, transform module 104 may apply a discrete cosine transform (DCT), a directional transform, or a conceptually similar transform to a residual video block.

After transform module 104 generates a transform coefficient block, quantization module 106 may quantize the transform coefficients in the transform coefficient block. Quantization module 106 may quantize a transform coefficient block based on a QP value. If source device 20 determines that a scene change has occurred, source device 20 may increase the QP value to a greater (e.g., maximum) level in order to minimize the bit depths of the transform coefficients in the transform coefficient blocks. In subsequent pictures, source device 20 may increase the QP value in order to gradually increase the bit depths of the transform coefficients in transform coefficient blocks of the subsequent pictures.

Inverse quantization module 108 and inverse transform module 110 may apply inverse quantization and inverse transforms to the transform coefficient block, respectively, to reconstruct a residual video block from the transform coefficient block. Reconstruction module 112 may add one or more reconstructed residual video blocks associated with the current video block to corresponding samples from one or more predicted video blocks associated with the current video block to reconstruct the current video block. After reconstruction module 112 reconstructs the current video block, decoded picture buffer 114 may store the current video block. Motion estimation module 122 and motion compensation module 124 may use a reference picture that contains reconstructed video blocks to perform inter prediction on video blocks of other pictures. In addition, intra prediction module 126 may use reconstructed video blocks in decoded picture buffer 114 to perform intra prediction on other video blocks in the same picture.

Entropy encoding module 116 may receive data from other functional components of video encoder 98. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 98 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

Figure 3:
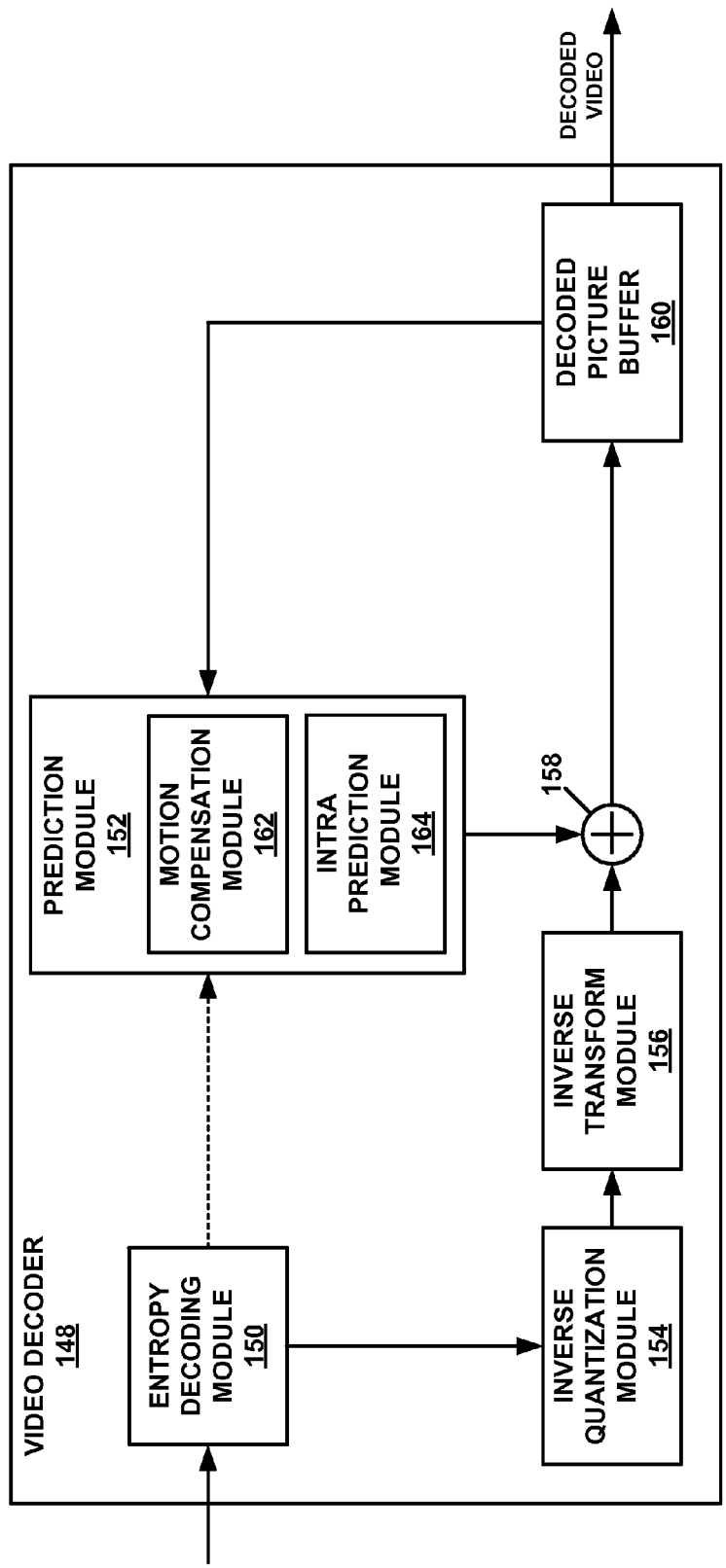
FIG. 3 is a block diagram that illustrates an example video decoder that is configured to implement one or more techniques of this disclosure.

FIG. 3 is a block diagram that illustrates an example video decoder 148 that is configured to implement one or more techniques of this disclosure. Media decoder 64 of sink device 60 may include video decoder 148. In the example of FIG. 3, video decoder 148 includes a plurality of functional components. The functional components of video decoder 148 include an entropy decoding module 150, a prediction module 152, an inverse quantization module 154, an inverse transform module 156, a reconstruction module 158, and a decoded picture buffer 160. Prediction module 152 includes a motion compensation module 162 and an intra prediction module 164. In some examples, video decoder 148 may perform a decoding pass that is generally reciprocal to the encoding pass described with respect to video encoder 98 of FIG. 2. In other examples, video decoder 148 may include more, fewer, or different functional components.

Video decoder 148 may receive a bitstream that comprises encoded video data. The bitstream may include a plurality of syntax elements. When video decoder 148 receives the bitstream, entropy decoding module 150 may perform a parsing operation on the bitstream to extract the syntax elements from the bitstream. As part of performing the parsing operation, entropy decoding module 150 may entropy decode syntax elements in the bitstream. Prediction module 152, inverse quantization module 154, inverse transform module 156, and reconstruction module 158 may perform a reconstruction operation that generates decoded video data based on the syntax elements extracted from the bitstream.

As part of performing a reconstruction operation, inverse quantization module 154 may inverse quantize, i.e., de-quantize, a transform coefficient block associated with the current video block. The current video block may be a video block that video decoder 148 is currently decoding. Inverse quantization module 154 may inverse quantize the transform coefficient block in a manner proposed for HEVC or H.264.

Inverse quantization module 154 may use a QP calculated by video encoder 98 to determine a degree of quantization and, likewise, a degree of inverse quantization for inverse quantization module 154 to apply.

After inverse quantization module 154 inverse quantizes a transform coefficient block, inverse transform module 156 may apply an inverse transform to the transform coefficient block in order to generate a residual video block associated with the current video block. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

If the current video block is encoded using intra prediction, intra prediction module 164 may perform, based at least in part on samples from neighboring video blocks and an intra prediction mode specified in the bitstream, intra prediction to generate a predictive video block associated with the current video block. If the current video block is encoded using inter prediction, motion compensation module 162 may perform motion compensation to generate a predictive video block associated with the current video block. Motion compensation module 162 may use motion information for the current video block to identify or synthesize one or more reference blocks. The reference blocks may be in different temporal pictures than the current video block. The motion information for the current video block may include one or more motion vectors, one or more reference picture indexes, and one or more syntax elements that indicate whether the reference pictures in list 0, list 1, or both list 0 and list 1 are used. Motion compensation module 162 may use the one or more reference blocks to generate the predictive video block associated with the current video block.

Reconstruction module 158 may use one or more residual video blocks and one or more predictive video blocks to reconstruct the current video block. For example, reconstruction module 158 may reconstruct the current video block by summing corresponding samples in a residual video block and a predictive video block. After reconstruction module 158 reconstructs the current video block, video decoder 148 may store the current video block in decoded picture buffer 160. Decoded picture buffer 160 may provide reference pictures for subsequent motion compensation, intra prediction, and presentation on a display device, such as display 66 of FIG. 1.

Figure 4:
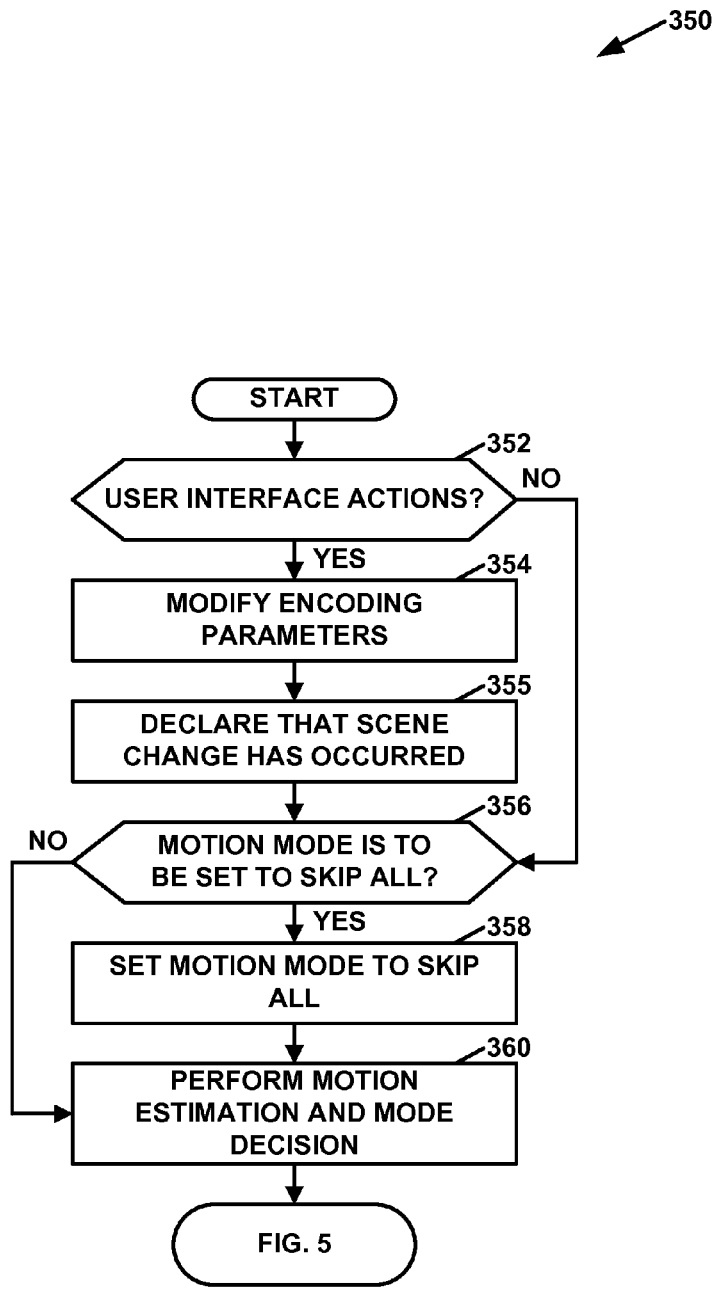
FIG. 4 is a flowchart that illustrates an example operation performed by a source device, in accordance with one or more techniques of this disclosure.

FIG. 4 is a flowchart that illustrates an example operation 350 performed by source device 20, in accordance with one or more techniques of this disclosure. Although FIG. 4 and the following figures are described with reference to FIG. 1, the discussion of these figures is not limited to the example of FIG. 1. Source device 20 may perform operation 350 when encoding and transmitting video data. As described below, when source device 20 performs operation 350, source device 20 may determine whether scene changes have occurred, decrease the numbers of coding bits in encoded representations of pictures in response to scene changes, increase the bandwidth of wireless channel 50 in response to scene changes, and transmit encoded representations of pictures.

After source device 20 starts operation 350, source device 20 may determine whether a user interface action has occurred (352). A user interface action may occur when source device 20 receives user input to modify a user interface displayed by source device 20 and/or sink device 60. The user interface action may result in an abrupt change the video data. In other words, there may be little similarity between pictures before and after the user interface action. Hence, source device 20 may determine that a scene change has occurred if a user interface action has occurred. For example, source device 20 may determine that a user interface action has occurred if source device 20 or sink device 60 has received user input to open a full screen application. In another example, source device 20 may determine that a user interface action has occurred if source device 20 or sink device 60 has received user input to switch between full screen applications.

If a user interface action has occurred ("YES" of 352), source device 20 may modify one or more encoding parameters to reduce the number of coding bits in the encoded representation of the current picture (354). For instance, source device 20 may set a QP parameter to an increased (e.g., maximum) value, restart a GOP at the current picture, set slice modes of slices in the current picture to IDR slice, and set the slice types of slices in the current picture to I slice. In addition, if a user interface action has occurred, source device 20 may declare that a scene change has occurred (355). When source device 20 declares that a scene change has occurred, source device 20 may store data to indicate for future processing that a scene change has occurred. Source device 20 does not, in typical examples, generate output when source device 20 declares that a scene change has occurred.

After declaring that a scene change has occurred, or after determining that no user interface action has occurred ("NO" of 352), source device 20 may determine whether a motion mode for the current picture is to be set to "skip all" (356). Source device 20 may determine that the motion mode for the current picture is to be set to "skip all" for various reasons. For example, source device 20 may determine that the motion mode for the current picture is to be set to "skip all" if source device 20 or sink device 60 receives user input indicating that the current picture is not to be displayed at sink device 60.

If the motion mode for the current picture is not to be set to "skip all" ("NO" of 356), source device 20 may perform a motion estimation and mode decision operation (360). When source device 20 performs the motion estimation and mode decision operation, source device 20 may partition the current picture into a plurality of video blocks. For each of the video blocks in a P or B slice of the current picture, source device 20 may perform an intra prediction operation and an inter prediction operation. When source device 20 performs the intra prediction operation, source device 20 may generate a first encoded representation of the video block. When source device 20 performs the inter prediction operation, source device 20 may perform a motion estimation operation and may generate a second encoded representation of the video block. Source device 20 may then determine, based at least in part on the numbers of coding bits in the first and second encoded representations of the video block, whether to use the first or second encoded representations of the video block in the encoded version of the current picture.

If the motion mode for the current picture is not to be set to "skip all" ("YES" of 356), source device 20 may set a parameter that restricts source device 20 to selecting skip mode when encoding the current picture (358). Source device 20 may then perform the motion estimation and mode decision operation (360). However, when source device 20 performs the motion estimation and mode decision operation after determining that the motion mode for the current picture has been set to "skip all," source device 20 may determine that all video blocks of the current picture are in skip mode. Using skip mode for all video blocks when the user does not want a picture to be displayed may result in the current picture having the same appearance as the previously coded picture. When source device 20 uses skip mode for all video blocks of the current picture, the encoded representation of the current picture may be smaller than the encoded representation of the previously coded picture. Thus, if the user wants sink device 60 to continue displaying the previously coded picture instead of a current picture, it may be more energy and bandwidth efficient to use skip mode for all video blocks of the current picture.

Figure 5:
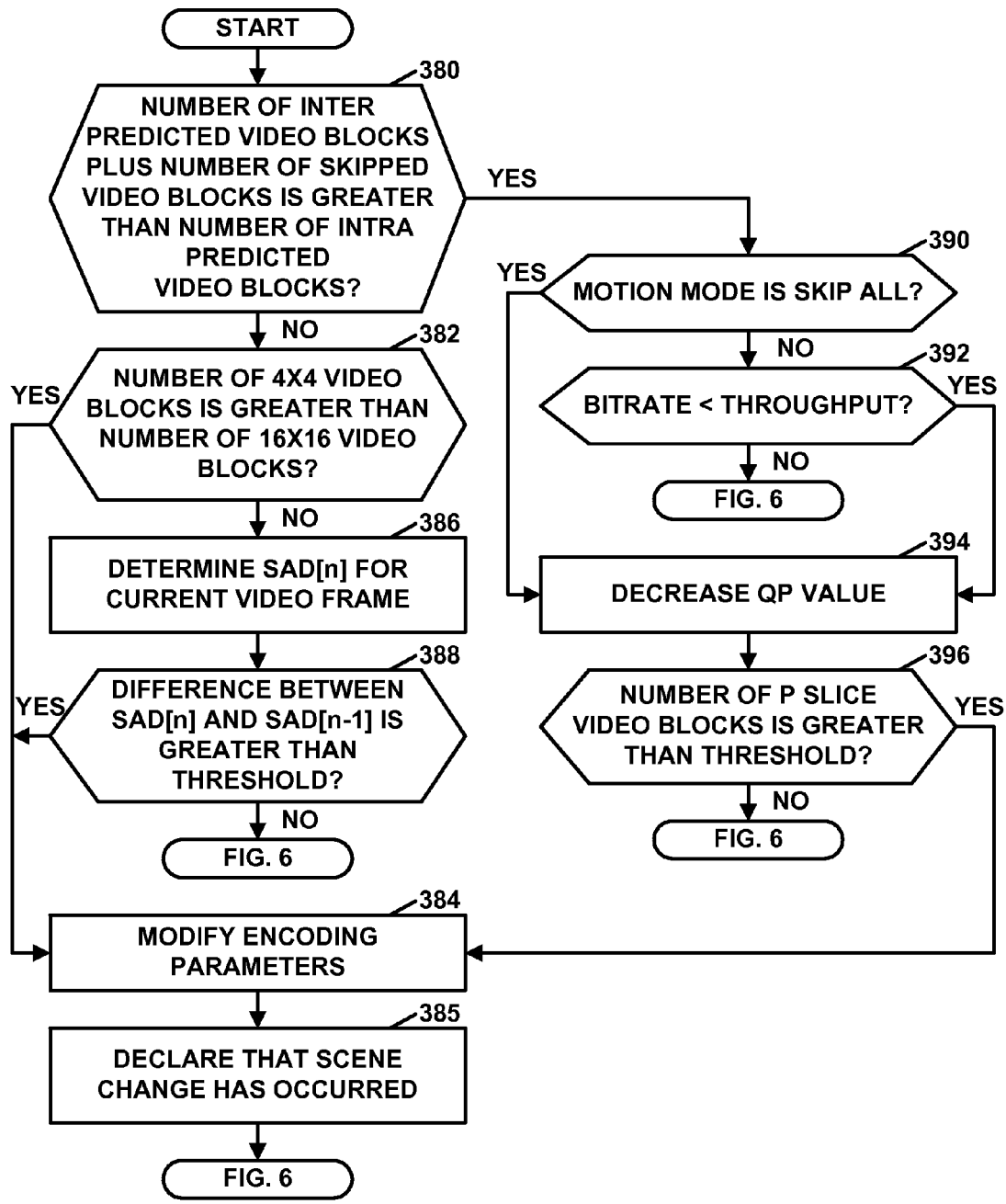
FIG. 5 is a flowchart that illustrates a continuation of the example operation of FIG. 4.

After source device 20 performs the motion estimation and mode decision operation, source device 20 may perform the portion of operation 350 shown in FIG. 5. FIG. 5 is a flowchart that illustrates a continuation of the example operation 350 of FIG. 4. After source device 20 starts the portion of operation 350 shown in FIG. 5, source device 20 may determine whether the number of inter predicted video blocks in the current picture plus the number of skip video blocks in the current picture is greater than the number of intra predicted video blocks in the current picture (380). In some examples, source device 20 may determine whether the number of inter predicted video blocks in the current picture plus the number of skip video blocks in the current picture is greater than the number of intra predicted video blocks in the current picture by a particular threshold amount.

If the number of inter predicted video blocks in the current picture plus the number of skip video blocks in the current picture is not greater than the number of intra predicted video blocks in the current picture ("NO" of 380), source device 20 may determine, as another way to determine whether a scene change has occurred, whether the number of 4×4 video blocks in the encoded representation of the current picture is greater than the number of 16×16 video blocks in the encoded representation of the current picture (382). For example, source device 20 may determine whether the number of 4×4 macroblocks in the encoded representation of the current picture is greater than the number of 16×16 macroblocks in the encoded representation of the current picture. A 16×16 video block may be a video block that has a width of 16 and a height of 16. Similarly, a 4×4 video block may be a video block that has a width of 4 and a height of 4.

If the number of 4×4 video blocks in the encoded representation of the current picture is greater than the number of 16×16 video blocks in the encoded representation of the current picture ("YES" of 382), source device 20 may modify one or more encoding parameters to reduce the number of coding bits in the encoded representation of the current picture (384). For instance, source device 20 may set a QP parameter to an increased (e.g., maximum) value, restart a GOP at the current picture, set slice modes of slices in the current picture to IDR slice, and set the slice types of slices in the current picture to I slice.

In addition, source device 20 may declare that a scene change has occurred (385). Hence, in this example, source device 20 may determine, based at least in part on sizes of video blocks in the encoded representation of the current picture, that the scene change has occurred. Specifically, in the example of FIG. 5, source device 20 may determine that a scene change has occurred if a number of 4×4 video blocks in the encoded representation of the current picture is greater than a number of 16×16 video blocks in the encoded representation of the current picture. In some examples, source device 20 may determine that a scene change has occurred if a difference between the number of 4×4 video blocks in the encoded representation of the current picture and the number of 16×16 video blocks in the encoded representation of the current picture is greater than a particular threshold.

Figure 6:
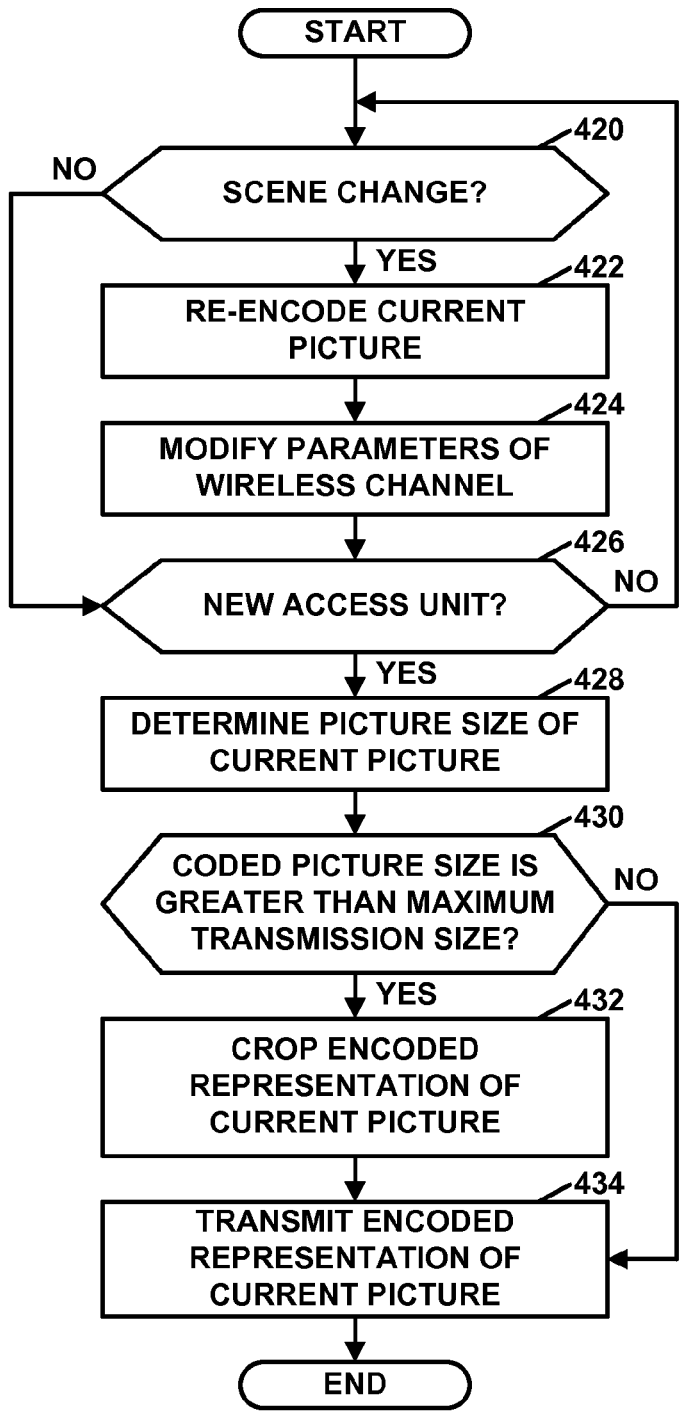
FIG. 6 is a flowchart that illustrates a further continuation of the example operation of FIG. 4.

After source device 20 determines that a scene change has occurred, operation 350 may perform the portion of operation 350 shown in FIG. 6. Source device 20 may determine that a scene change has occurred in these circumstances because the encoded representation of the current picture is likely to include a relatively large number of bits if there are a relatively large number of small video blocks as compared to large video blocks. For instance, if the current picture is a P picture or a B picture, source device 20 may encode the current picture with a large number of small video blocks if there is relatively little redundancy between the current picture and previously encoded pictures. In this way, source device 20 may perform a spatial complexity test to determine whether a scene change has occurred. A P picture may be a picture that includes P slices. A B picture may be a picture that includes B slices.

If the number of 4×4 video blocks in the encoded representation of the current picture is not greater than the number of 16×16 video blocks in the encoded representation of the current picture ("NO" of 382), source device 20 may determine a sum of absolute differences (SAD) for the current picture (386). Source device 20 may determine the sum of absolute differences for the current picture by totaling the transform coefficients for all inter predicted video blocks in the encoded representation of the current video block.

Source device 20 may then determine whether the difference between the sum of absolute differences for the current picture and a sum of absolute differences for a previously-coded picture is greater than a threshold (388). That is, source device 20 may determine whether $SAD[n]-SAD[n-1]>$ threshold, where $SAD[n]$ denotes the sum of absolute differences for the current picture and $SAD[n-1]$ denotes the sum of absolute differences for the previously-coded picture. The threshold may depend on various factors. For example, the threshold may depend the source of the video data, a spatial resolution of the video data, and a datapath resolution of media encoder 28. In some examples, media encoder 28 may be have a 12-bit datapath resolution. By measuring differences in SAD values for pictures, source device 20 may be able to detect changes between pictures, regardless of the motion estimation decisions associated with the pictures. This may be valuable because the motion estimation decisions associated with the pictures may be skewed in favor of other priorities. In some examples, the SAD different threshold may be approximately $2^{20}$.

If the difference between the sum of absolute differences for the current picture and the sum of absolute differences for the previously-coded picture is greater than the threshold ("YES" of 388), source device 20 may modify one or more encoding parameters to reduce the number of coding bits in the encoded representation of the current picture (384), declare that a scene change has occurred (385), and then perform the portion of operation 350 shown in FIG. 6. Thus, source device 20 may determine that a scene change has occurred, based at least in part on a difference between a sum of absolute differences for the previously-coded picture and a sum of absolute differences for the current picture, the sum of absolute differences for the previously-coded picture indicating a sum of absolute values of transform coefficients associated with inter predicted video blocks in an encoded representation of the previously-coded picture, the sum of absolute differences for the current picture indicating a sum of absolute values of transform coefficients associated with inter predicted video blocks in the encoded representation of the current video block.

On the other hand, if the difference between the sum of absolute differences for the current picture and the sum of absolute differences for the previously-coded picture is not greater than the threshold ("NO" of 388), source device 20 may perform the portion of operation 350 shown in FIG. 6 without declaring that a scene change has occurred.

If the number of inter predicted video blocks in the encoded representation of the current picture plus the number of skip video blocks in the encoded representation of the current picture is greater than the number of intra predicted video blocks in the encoded representation of the current picture ("YES" of 380), source device 20 may determine whether the motion mode for the current picture is "skip all" (390). Source device 20 may set the motion mode for the current picture during the motion estimation and mode decision operation of action 360. If the motion mode for the current picture is "skip all" ("YES" of 390), source device 20 may determine whether a current bit rate is less than the current throughput of wireless channel 50 (392). The current bit rate may be an average of the number of coding bits in the current picture and/or one or more previously-pictures divided by the number of frames per second. The current throughput of wireless channel 50 may be an estimate of the number of bits transferable over wireless channel 50 per second. This estimate can be configured based on more or less aggressive assumptions about retransmission rates and other factors. If the current bit rate of the bitstream is not less than the current throughput of wireless channel 50 ("NO" of 392), source device 20 may perform the portion of operation 350 illustrated in FIG. 6 without determining that a scene change has occurred.

However, if the current bitrate of the current picture is less than the current throughput of wireless channel 50 ("YES" of 392) or if the motion mode for the current picture is "skip all" ("YES" of 390), source device 20 may decrease the QP value (394). When source device 20 re-encodes the current picture with the decreased QP value, source device 20 may apply a decreased degree of quantization and, as a result, the number of coding bits in the encoded representation of the current picture may increase. Source device 20 may decrease the QP value in various ways. For example, source device 20 may decrease the QP value as a function of the QP value used when encoding a previous picture, the number of skip mode video blocks in the current picture, the number of inter predicted video blocks in the current picture, and the number of intra predicted video blocks in the current picture. In this way, source device 20 may adapt the QP value to increase the bit depths of transform coefficients in transform coefficient blocks of the current picture.

After decreasing the QP value, source device 20 may determine whether the number of P slice video blocks in the current picture is greater than a threshold (396). The number of P slice video blocks in the current picture may be equal to the number of video blocks in P slices of the current picture. If the number of P slice video blocks is greater than the threshold ("YES" of 396), source device 20 may modify one or more encoding parameters to reduce the number of coding bits in the encoded representation of the current picture (384), declare that a scene change has occurred (385), and then perform the portion of operation 350 illustrated in FIG. 6. Otherwise, if the number of P frame video blocks is not greater than the threshold ("NO" of 396), source device 20 may perform the portion of operation 350 illustrated in FIG. 6 without determining that a scene change has occurred.

If the current picture is in a series of pictures that is unchanging, every video block in the current picture may be encoded in skip mode. Such series of unchanging pictures may be common in synthetic video data, such as graphical user interfaces, menus, etc. Accordingly, it may be advantageous to declare a scene change when even a small percentage of the video blocks of the current picture are in P slices. For instance, source device 20 may declare a scene change if the number of P slice video blocks in the current picture is greater than 10% of the video blocks in the current picture.

FIG. 6 is a flowchart that illustrates a further continuation of operation 350. After source device 20 starts the portion of operation 350 illustrated in the example of FIG. 6, source device 20 may determine whether source device 20 has previously declared in operation 350 that a scene change occurred between the current picture and a previously-encoded picture (420). If a scene change has occurred ("YES" of 420), source device 20 may re-encode the current picture using encoding parameters modified earlier in operation 350 (422). Source device 20 may modify the encoding parameters in actions 354, 384, and 394 described above. In this way, source device 20 may reduce the number of coding bits in the encoded representation of the current picture.

Furthermore, if source device 20 determined that a scene change has occurred, source device 20 may modify one or more parameters of wireless channel 50 to maximize the throughput of wireless channel 50 (424). For instance, source device 20 may activate a greater (e.g., a maximum) number of transmitters, increase transmit power, reduce the rate of FEC bits to a lower (e.g., a minimum) FEC rate, increase a media access layer (MAC) SDU size to a greater (e.g., a maximum) MAC SDU size, enable packet aggregation, restrict or disable retransmission, and so on. The minimum FEC rate may be a minimum allowable rate of FEC bits in data transmitted on wireless channel 50.

After modifying the parameters of wireless channel 50 or if no scene change has occurred ("NO" of 420), source device 20 may determine whether a new access unit is at a head of a queue for transmission on wireless channel 50 (426). An access unit may be a set of units (e.g., packets or network abstraction layer (NAL) units) that contain data that, when decoded, results in a complete decoded picture. If a new access unit is not yet at the head of the queue for transmission on wireless channel 50 ("NO" of 426), source device 20 may loop back to the start of the portion of operation 350 shown in FIG. 6.

On the other hand, if a new access unit is at the head of the queue for transmission on wireless channel 50 ("YES" of 426), source device 20 may determine a picture size of the current picture (428). The picture size of the current picture may indicate how many coding bits are in the encoded representation of the current picture. In some examples, source device 20 may determine the picture size of the current picture by subtracting a pointer that indicates a memory location of a last byte of the encoded representation of the current picture from a pointer that indicates a memory location of a last byte of an encoded representation of a previously-encoded picture. The encoded representation of the current picture may include a series of coding bits (e.g., entropy coded bits) that are decodable to obtain the current picture. Source device 20 may then determine whether the picture size of the current picture is greater than a maximum transmission size (430). The maximum transmission size may be a pre-determined threshold that caps the number of coding bits of an encoded representation of a picture that source device 20 may attempt to transmit over wireless channel 50 for the picture.

If the picture size of the current picture is greater than the maximum transmission size ("YES" of 430), source device 20 may crop the encoded representation of the current picture (432). When source device 20 crops the encoded representation of the current picture, source device 20 may discard and not transmit some coding bits in the encoded representation of the current picture. For instance, source device 20 may discard and not transmit a latter half of the coding bits in the encoded representation of the current picture. In this example, source device 20 may crop the encoded representation of the current picture by truncating the encoded representation of the current picture.

After cropping the encoded representation of the current picture or after determining that the size of the encoded representation of the current picture is less than the maximum transmission size ("NO" of 430), source device 20 may transmit the encoded representation of the current picture in accordance with the current parameters of wireless channel 50 (434). For example, if the current parameters of wireless channel 50 indicate that the rate of FEC bits is set to a minimum FEC rate, source device 20 may transmit the encoded representation of the current picture along with FEC bits at the lower (e.g., minimum) FEC rate.

Figure 7:
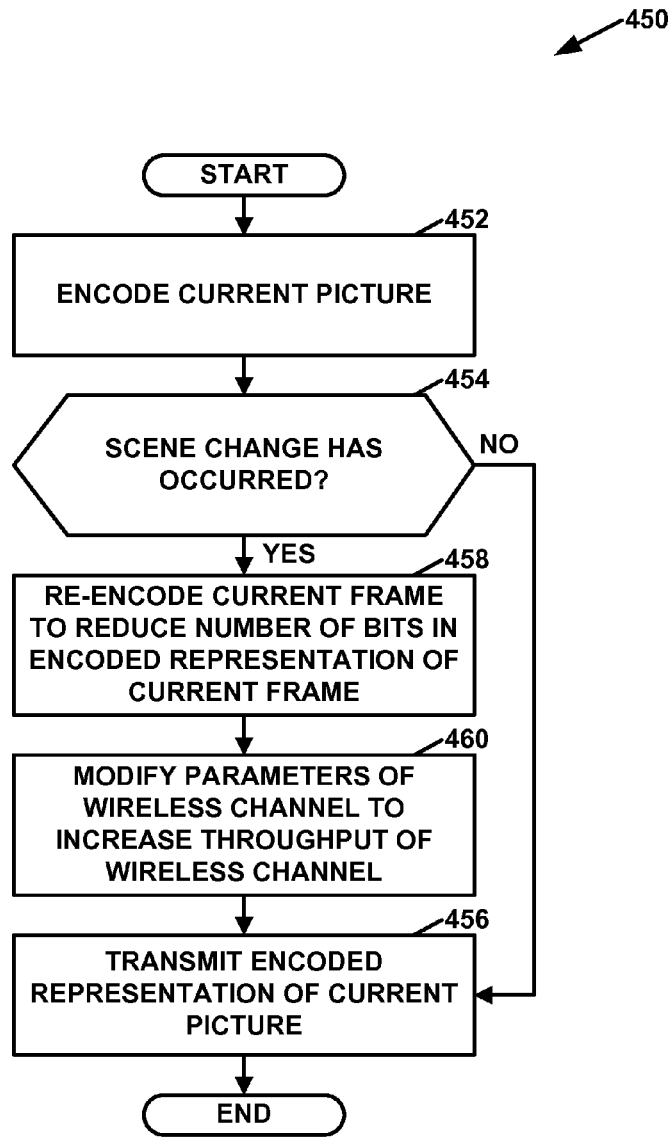
FIG. 7 is a flowchart that illustrates an example operation for encoding video data in accordance with one or more techniques of this disclosure.

FIG. 7 is a flowchart that illustrates an example operation 450 for encoding video data in accordance with one or more techniques of this disclosure. FIGS. 4-6 may be a specific example of operation 450.

After operation 450 starts, source device 20 may encode a current picture of the video data (452). After encoding the current picture, source device 20 may determine whether a scene change has occurred between a previously-coded picture (e.g., a first picture) and the current picture (e.g., a second picture) (454). As described in this disclosure, source device 20 may determine whether the scene change has occurred based on various metrics, such as the sizes of video blocks in the encoded representation of the current frame, the number of intra, inter, and skip predicted video blocks in the encoded representation of the current frame, and so on.

If a scene change has not occurred ("NO" of 454), source device 20 may transmit the encoded representation of the current picture (456). Otherwise, if the scene change has occurred ("YES" of 454), source device 20 may re-encode the current picture to reduce the number of coding bits in the encoded representation of the current picture (458). As discussed elsewhere in this disclosure, source device 20 may re-encode the current picture to reduce the number of coding bits in the encoded representation of the current picture in various ways. For example, source device 20 may re-encode the current picture using an increased QP value.

In addition, source device 20 may modify parameters of wireless channel 50 to increase the throughput of wireless channel 50 (460). As discussed in this disclosure, source device 20 may modify various parameters of wireless channel 50 to increase the throughput of wireless channel 50. For example, source device 20 may increase a service data unit size, enable additional wireless transmitters, reduce forward error correction data, aggregate packets, restrict or disable retransmission of lost packets, or otherwise modify parameters of wireless channel 50 to increase the throughput of wireless channel 50.

After re-encoding the current frame and modifying the parameters of wireless channel 50, source device 20 may transmit the encoded representation of the current picture (456). Source device 20 may use the modified parameters of wireless channel 50 when transmitting the re-encoded representation of the current picture.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method for transmitting video data, the method comprising:
    determining that a scene change has occurred between a first picture in the video data and a second picture in the video data prior to transmitting an encoded representation of the second picture;
    reducing, in response to determining that the scene change has occurred, a number of coding bits in the encoded representation of the second picture;
    increasing, in response to determining that the scene change has occurred, a throughput of a wireless channel to be used to transmit the encoded representation of the second picture; and
    after reducing the number of coding bits in the encoded representation of the second picture and increasing the throughput of the wireless channel, transmitting the encoded representation of the second picture via the wireless channel.

2. The method of claim 1, wherein determining that the scene change has occurred comprises determining, based at least in part on sizes of video blocks in the encoded representation of the second picture, that the scene change has occurred.

3. The method of claim 2, wherein determining that the scene change has occurred comprises determining that the scene change has occurred if a number of 4×4 video blocks in the encoded representation of the second picture is greater than a number of 16×16 video blocks in the encoded representation of the second picture.

4. The method of claim 1, wherein determining that the scene change has occurred comprises determining that the scene change has occurred, based at least in part on numbers of inter predicted video blocks in the encoded representation of the second picture, skip mode video blocks in the encoded representation of the second picture, and intra predicted video blocks in the encoded representation of the second picture.

5. The method of claim 1, wherein determining that the scene change has occurred comprises determining that the scene change has occurred, based at least in part on a difference between a sum of absolute differences for the first picture and a sum of absolute differences for the second picture, the sum of absolute differences for the first picture indicating a sum of absolute values of transform coefficients associated with inter predicted video blocks in an encoded representation of the first picture, the sum of absolute differences for the second picture indicating a sum of absolute values of transform coefficients associated with inter predicted video blocks in the encoded representation of the second video block.

6. The method of claim 1, wherein reducing the number of coding bits in the encoded representation of the second picture comprises re-encoding the second picture with an increased degree of quantization.

7. The method of claim 1, further comprising re-encoding, in response to determining that the scene change has occurred, the second picture such that each slice in the second picture is an intra predicted slice, each slice in the second picture is an instantaneous decoder refresh slice, and the second picture is a starting picture of a group of pictures.

8. The method of claim 1, wherein increasing the throughput of the wireless channel comprises increasing a service data unit size of the wireless channel in response to determining that the scene change has occurred.

9. The method of claim 1, wherein increasing the throughput of the wireless channel comprises increasing a number of antennas used to transmit the encoded representation of the second picture.

10. The method of claim 1, wherein increasing the throughput of the wireless channel comprises reducing, in response to determining that the scene change has occurred, forward error correction data in packets that contain the encoded representation of the second picture.

11. The method of claim 1, wherein increasing the throughput of the wireless channel comprises aggregating, in response to determining that the scene change has occurred, packets that contain the encoded representation of the second picture.

12. The method of claim 1, wherein increasing the throughput of the wireless channel comprises restricting, in response to determining that the scene change has occurred, retransmission of packets on the wireless channel.

13. The method of claim 1, further comprising:
decreasing degrees of quantization associated with pictures of the video data that follow the second picture; and
decreasing the throughput of the wireless channel for the pictures that follow the second picture.

14. A computing device that comprises:
one or more wireless transmitters; and
one or more processors that are configured to:
determine that a scene change has occurred between a first picture of video data and a second picture in the video data prior to transmitting an encoded representation of the second picture;
reduce, in response to determining that the scene change has occurred, a number of coding bits in the encoded representation of the second picture;
increase, in response to determining that the scene change has occurred, a throughput of a wireless channel to be used to transmit the encoded representation of the second picture; and
after reducing the number of coding bits in the encoded representation of the second picture and increasing the throughput of the wireless channel, use the one or more wireless transmitters to transmit the encoded representation of the second picture via the wireless channel.

15. The computing device of claim 14, wherein the one or more processors are configured to determine, based at least in part on sizes of video blocks in the encoded representation of the second picture, that the scene change has occurred.

16. The computing device of claim 15, wherein the one or more processors are configured to determine that the scene change has occurred if a number of 4×4 video blocks in the encoded representation of the second picture is greater than a number of 16×16 video blocks in the encoded representation of the second picture.

17. The computing device of claim 14, wherein the one or more processors are configured to determine that the scene change has occurred, based at least in part on numbers of inter predicted video blocks in the encoded representation of the second picture, skip mode video blocks in the encoded representation of the second picture, and intra predicted video blocks in the encoded representation of the second picture.

18. The computing device of claim 14, wherein the one or more processors are configured to determine that the scene change has occurred, based at least in part on a difference between a sum of absolute differences for the first picture and a sum of absolute differences for the second picture, the sum of absolute differences for the first picture indicating a sum of absolute values of transform coefficients associated with inter predicted video blocks in an encoded representation of the first picture, the sum of absolute differences for the second picture indicating a sum of absolute values of transform coefficients associated with inter predicted video blocks in the encoded representation of the second video block.

19. The computing device of claim 14, wherein the one or more processors are configured to reduce the number of coding bits in the encoded representation of the second picture at least in part by re-encoding the second picture with an increased degree of quantization.

20. The computing device of claim 14, wherein the one or more processors are configured to re-encode, in response to determining that the scene change has occurred, the second picture such that each slice in the second picture is an intra predicted slice, each slice in the second picture is an instantaneous decoder refresh slice, and the second picture is a starting picture of a group of pictures.

21. The computing device of claim 14, wherein the one or more processors are configured to increase the throughput of the wireless channel at least in part by increasing a service data unit size of the wireless channel in response to determining that the scene change has occurred.

22. The computing device of claim 14, wherein the one or more processors are configured to increase the throughput of the wireless channel at least in part by increasing a number of antennas used to transmit the encoded representation of the second picture.

23. The computing device of claim 14, wherein the one or more processors are configured to increase the throughput of the wireless channel at least in part by reducing, in response to determining that the scene change has occurred, forward error correction data in packets that contain the encoded representation of the second picture.

24. The computing device of claim 14, wherein the one or more processors are configured to increase the throughput of the wireless channel at least in part by aggregating, in response to determining that the scene change has occurred, packets that contain the encoded representation of the second picture.

25. The computing device of claim 14, wherein the one or more processors are configured to increase the throughput of the wireless channel at least in part by restricting, in response to determining that the scene change has occurred, retransmission of packets on the wireless channel.

26. The computing device of claim 14, wherein the one or more processors are configured to:
  decrease degrees of quantization associated with pictures of the video data that follow the second picture; and
  decrease the throughput of the wireless channel for the pictures that follow the second picture.

27. A computing device that comprises:
  means for determining that a scene change has occurred between a first picture in the video data and a second picture in the video data prior to transmitting an encoded representation of the second picture;
  means for reducing, in response to determining that the scene change has occurred, a number of coding bits in the encoded representation of the second picture;
  means for increasing, in response to determining that the scene change has occurred, a throughput of a wireless channel to be used to transmit the encoded representation of the second picture; and
  means for transmitting, after reducing the number of coding bits in the encoded representation of the second picture and increasing the throughput of the wireless channel, the encoded representation of the second picture via the wireless channel.

28. A computer program product that comprises one or more non-transitory computer-readable storage media that store instructions that, when executed by one or more non-transitory processors of a computing device, configure the computing device to:
  determine that a scene change has occurred between a first picture in the video data and a second picture in the video data prior to transmitting an encoded representation of the second picture;
  reduce, in response to determining that the scene change has occurred, a number of coding bits in the encoded representation of the second picture;
  increase, in response to determining that the scene change has occurred, a throughput of a wireless channel to be used to transmit the encoded representation of the second picture; and
  after reducing the number of coding bits in the encoded representation of the second picture and increasing the throughput of the wireless channel, use the one or more wireless transmitters to transmit the encoded representation of the second picture to the sink device via the wireless channel.

* * * * *